(12) United States Patent
Mendhekar

(10) Patent No.: US 10,015,507 B2
(45) Date of Patent: Jul. 3, 2018

(54) TRANSFORM SYSTEM AND METHOD IN VIDEO AND IMAGE COMPRESSION

(71) Applicant: Cinova Media, Mountain View, CA (US)

(72) Inventor: Anurag Mendhekar, Los Altos, CA (US)

(73) Assignee: CINOVA MEDIA, Mountain View, CA (US)

( * ) Notice: Subject to any disclaimer, the term of this patent is extended or adjusted under 35 U.S.C. 154(b) by 465 days.

(21) Appl. No.: 14/281,788

(22) Filed: May 19, 2014

(65) Prior Publication Data

US 2014/0341304 A1 Nov. 20, 2014

Related U.S. Application Data

(60) Provisional application No. 61/825,487, filed on May 20, 2013.

(51) Int. Cl.
| | | |
|---|---|---|
| *H04N 19/48* | (2014.01) | |
| *H04N 19/12* | (2014.01) | |
| *H04N 19/40* | (2014.01) | |
| *H04N 19/18* | (2014.01) | |
| *H04N 19/154* | (2014.01) | |
| *H04N 19/50* | (2014.01) | |
| *H04N 19/56* | (2014.01) | |
| *H04N 19/563* | (2014.01) | |
| *H04N 19/625* | (2014.01) | |

(52) U.S. Cl.
CPC ............. *H04N 19/48* (2014.11); *H04N 19/12* (2014.11); *H04N 19/154* (2014.11); *H04N 19/18* (2014.11); *H04N 19/40* (2014.11); *H04N 19/625* (2014.11)

(58) Field of Classification Search
CPC .... H04N 19/40; H04N 19/625; H04N 19/563; H04N 19/903
See application file for complete search history.

(56) References Cited

U.S. PATENT DOCUMENTS

| | | |
|---|---|---|
| 5,596,659 A | 1/1997 | Normile et al. |
| 5,703,799 A | 12/1997 | Ohta |
| 6,016,360 A | 1/2000 | Nguyen et al. |
| 6,052,205 A | 4/2000 | Matsuura |
| 6,128,407 A | 10/2000 | Inoue et al. |
| 6,393,156 B1 | 5/2002 | Nguyen et al. |
| 6,463,178 B1 | 10/2002 | Kondo et al. |
| 6,625,221 B2 | 9/2003 | Knee et al. |
| 6,690,731 B1 | 2/2004 | Gough et al. |
| 6,697,521 B2 | 2/2004 | Islam et al. |
| 6,792,153 B1 | 9/2004 | Tsujii |
| 7,003,167 B2 | 2/2006 | Mukherjee |
| 7,149,811 B2 | 12/2006 | Wise et al. |
| 7,791,508 B2 | 9/2010 | Wegener |

(Continued)

FOREIGN PATENT DOCUMENTS

| | | |
|---|---|---|
| JP | 2003-018412 | 1/2003 |
| JP | 2004-173205 | 6/2004 |

(Continued)

*Primary Examiner* — Obafemi Sosanya
(74) *Attorney, Agent, or Firm* — DLA Piper LLP (US)

(57) ABSTRACT

A system and method for frequency reduction and restoration. The system and method may be used to reduce the visual redundancy in digital data, such as in video data and image data.

33 Claims, 4 Drawing Sheets

(56) References Cited

U.S. PATENT DOCUMENTS

| | | |
|---|---|---|
| 7,916,960 B2 | 3/2011 | Mizuno |
| 7,965,900 B2 | 6/2011 | Maurer et al. |
| 8,077,990 B2 | 12/2011 | Islam |
| 8,130,828 B2 | 3/2012 | Hsu et al. |
| 8,265,144 B2 | 9/2012 | Christoffersen et al. |
| 8,422,804 B2 | 4/2013 | Islam |
| 2001/0031009 A1 | 10/2001 | Knee et al. |
| 2001/0041011 A1 | 11/2001 | Passagio et al. |
| 2001/0048770 A1 | 12/2001 | Maeda |
| 2003/0002734 A1 | 1/2003 | Islam et al. |
| 2003/0202581 A1 | 10/2003 | Kodama |
| 2003/0206590 A1* | 11/2003 | Krishnamachari .. H04N 19/139 375/240.16 |
| 2004/0264793 A1 | 12/2004 | Okubo |
| 2005/0063599 A1 | 3/2005 | Sato |
| 2006/0039473 A1 | 2/2006 | Filippini et al. |
| 2006/0115166 A1 | 6/2006 | Sung et al. |
| 2006/0285587 A1 | 12/2006 | Luo et al. |
| 2007/0019875 A1* | 1/2007 | Sung ................ H04N 19/50 382/239 |
| 2007/0237237 A1 | 10/2007 | Chang et al. |
| 2007/0248163 A1 | 10/2007 | Zuo et al. |
| 2008/0247658 A1* | 10/2008 | Lee ................ H04N 19/176 382/238 |
| 2010/0066912 A1 | 3/2010 | Kumwilaisak et al. |
| 2010/0266008 A1 | 10/2010 | Reznik |
| 2011/0103445 A1 | 5/2011 | Jax et al. |
| 2011/0206287 A1 | 8/2011 | Islam |
| 2014/0188451 A1 | 7/2014 | Asahara et al. |

FOREIGN PATENT DOCUMENTS

| | | |
|---|---|---|
| JP | 2007-104645 | 4/2007 |
| JP | 2007-318711 | 12/2007 |
| KR | 2003-0007080 | 1/2003 |
| KR | 10-2004-0106480 | 12/2004 |
| KR | 10-2007-0090185 | 9/2007 |
| KR | 10-2008-0090936 | 10/2008 |
| KR | 2010-0918377 | 9/2009 |
| WO | WO 2006/061734 | 6/2006 |

* cited by examiner

| | | | | | | | |
|---|---|---|---|---|---|---|---|
| 24 | 21 | 30 | 43 | 93 | 87 | 118 | 87 |
| 32 | 30 | 40 | 60 | 128 | 118 | 160 | 118 |
| 24 | 43 | 30 | 43 | 93 | 87 | 118 | 87 |
| 50 | 48 | 128 | 93 | 100 | 93 | 128 | 93 |
| 93 | 87 | 118 | 87 | 93 | 87 | 118 | 87 |
| 12 | 118 | 160 | 118 | 128 | 118 | 160 | 118 |
| 93 | 87 | 118 | 87 | 93 | 87 | 118 | 87 |

FIGURE 4A

TRANSFORM SYSTEM AND METHOD IN VIDEO AND IMAGE COMPRESSION

PRIORITY CLAIM

This application claims the benefit under 35 USC 119(e) and priority under 35 USC 120 to U.S. Provisional Patent Application No. 61/825,487 filed on May 20, 2013 and titled "Frequency Reduction and Restoration System and Method in Video and Image Compression", the entirety of which is incorporated herein by reference.

FIELD

The disclosure relates generally to video and image compression.

BACKGROUND

Digital data, such as digital images, moving picture images or videos, contain a lot of information (represented by pixels) that may need to be transformed. Transforming this information reduces the size of the digital data, such as images and videos, so that the digital data may be compressed. Thus, it is desirable to have a way in which that compressed digital data may be transformed.

BRIEF DESCRIPTION OF THE DRAWINGS

FIG. 4A illustrates an example of a transform information model, such as for example for the coefficients in a DCT transform.

DETAILED DESCRIPTION OF ONE OR MORE EMBODIMENTS

The disclosure is particularly applicable to a transform system and method for compressed digital data, such as image data or video data, and it is in this context that the disclosure will be described. It will be appreciated, however, that the transform has greater utility since it may be used for other types of data that have the need to be transformed to more efficiently compress the digital data.

Figure 1:
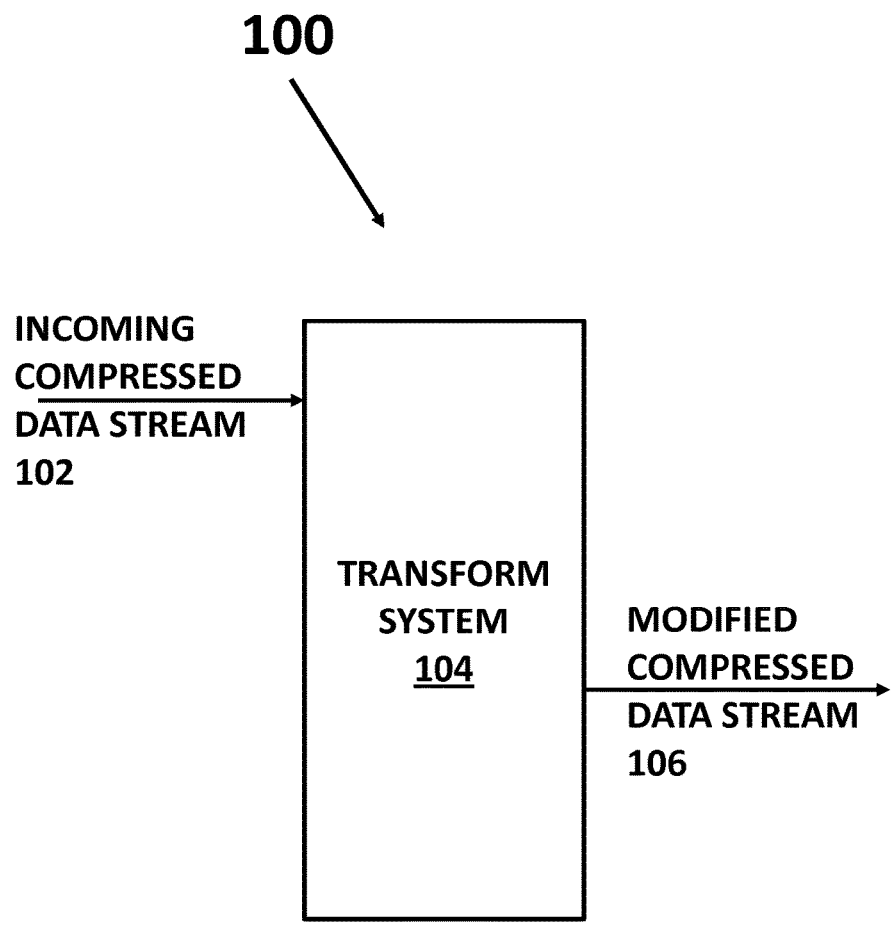
FIG. 1 illustrates an example of a transform system for an incoming compressed data stream, such as a discrete cosine transform compressed data stream.

FIG. 1 illustrates an example of a transform system 100 for transforming one or more variables of an incoming compressed data stream 102, such as compressed image data stream or compressed video data stream. The input data stream 102 may be a compressed data stream that is compressed, such as by using Discrete Cosine Transforms (DCTs). When the DCT is being used, the input data stream, for example, may a joint picture experts group (JPEG) file or data stream, a motion JPEG file/data stream or a video file/data stream that contains motion picture expert group (MPEG)-2, H.264 or H.265 compressed content. In the description provided below, the different types of DCT compressed data may be referred to collectively as DCT compressed data. The input stream 102 may be fed into a transform system 104 that may generate an output data stream 106 that may be a modified compressed data stream with the same type of compression, but the one or more variables of the incoming compressed data stream being modified as described in more detail below. The one or more variables may be a compression algorithm coefficient value, such as a DCT coefficient value, a value that causes noise reduction in the output signal and/or a re-quantization value.

The transform system 104 may be implemented in hardware or software or a combination of hardware and software. For example, the transform system 104 may be implemented in a processor that executes a plurality of lines of instructions or microcode to implement the processes described below in FIG. 3 or the system 104 may be implemented in a programmable hardware device, such as microcontroller, a field programmable gate array (FPGA) or an application specific integrated circuit (ASIC.) Alternatively, the system may be implemented in a plurality of lines of computer code that may be stored in a memory (DRAM, SRAM, flash, disk drive, optical drive) that may be accessed by a processor that executed the plurality of lines of computer code. The system 104 may also be implemented in a plurality of lines of computer code stored on a computer readable medium wherein the computer readable medium may be a compact disk, flash memory or other form a readable media, but may also be stored in a remote computer system (such as one or more server computers or one or more computing resources) and then downloaded and/or accessed by a user over a network. In addition, the transform system 104 may be incorporated into another system/product.

Figure 2:
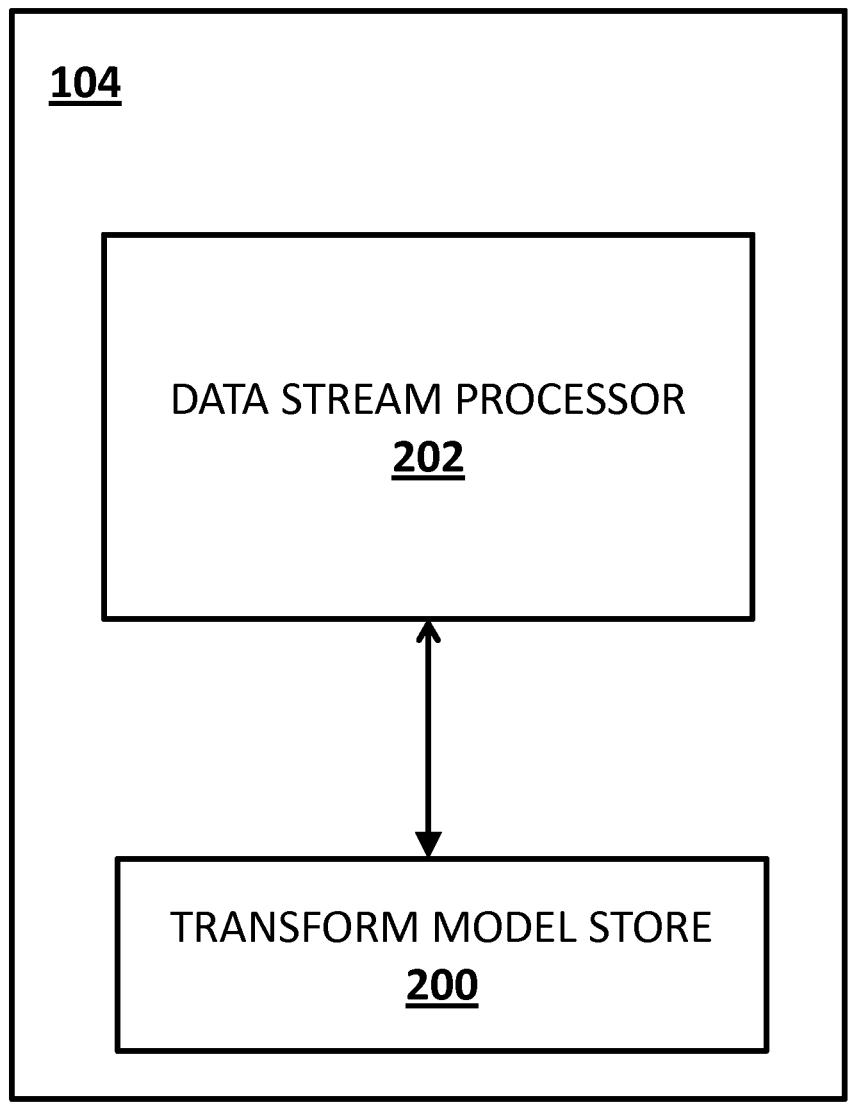
FIG. 2 illustrates more details of the transform system of FIG. 1.

FIG. 2 illustrates more details of the transform system 104 of FIG. 1. The transform system 104 may further comprise a transform information model 200 that is coupled to a data stream processor 202 that performs the transform processes as described below in more detail. The transform system 104 may have a store, such as a database, other storage device and/or a software storage system that stores a plurality of transform information models. In one embodiment, prior to actually processing the compressed data stream, the transform information model or the plurality of transform information models may be constructed by empirically analyzing a range of data streams. For example, for a transform for the frequency values in a DCT, the transform Information Model may contain numerical values that correspond to each of the frequencies used in the DCT. For example, an 8×8 DCT based data stream will have 64 frequencies for which the transform Information Model is constructed. One example of a transform Information Model for a low-detail DCT block (a block of DCT coefficients for a block of pixels with a low amount of content/visual information) is shown in FIG. 4A in which the positions in the matrix correspond to specific frequencies in the DCT block, and the values correspond to the amount of redundancy in that frequency. Thus, the transform Information model for the DCT coefficients may transform the DCT coefficients. In one example, the transform Information model for the DCT coefficients may be used to subtract a set of values from the coefficients in the incoming data as described below in more detail.

The transform information model may also be a matrix of values (as described below) that may be used to perform a mathematical function, such as dividing or multiplying, the coefficients in each block of the incoming data. For example, a transform information model for re-quantization or re-quantization may be an example of a transform information model that may be used to perform a mathematical function. For example, the transform information model for re-quantization may be used to divide the DCT and may further select a new quantization and scaling matrix for quantization and scaling which are both part of the information necessary in the H.264 stream to reconstruct a video when it is decoded.

In the transform method implementation, the values in the transform information model may be used to modify the values in the incoming compressed data stream. In some embodiments, the incoming compressed data stream may be partially decoded into a plurality of blocks of data values and the values in the transform information model may be used to modify the values in each block of data values. In one implementation, the numerical values stored in the transform information model may be subtracted from a given block in the compressed incoming data stream, such as an 8×8 DCT block in a DCT compressed incoming data stream, and the resulting image is visually indistinguishable from the image or video in the incoming data stream. The transform information model may have many different sets of values, each applicable under different circumstances as described in detail below.

Figure 3:
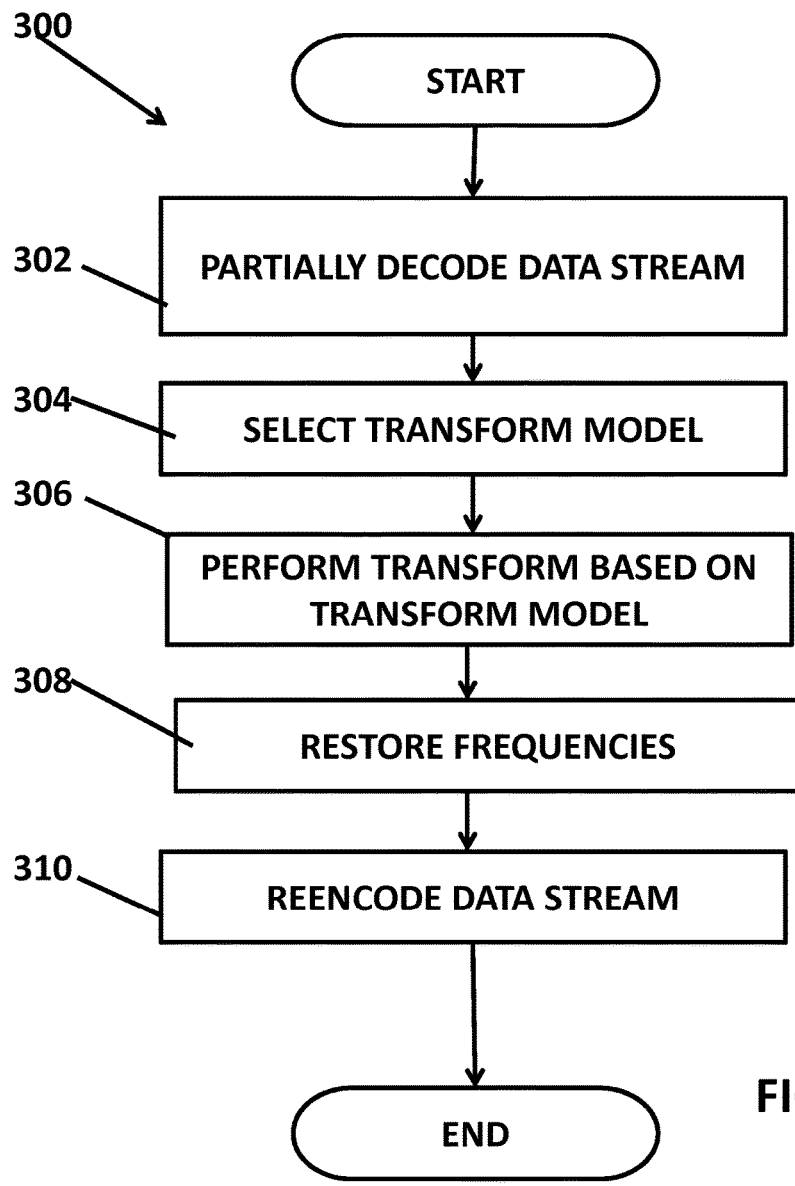
FIG. 3 is a flowchart of a transform method.

FIG. 3 is a flowchart of a transform method 300 that may be carried out by the system shown in FIGS. 1-2. In one embodiment, the processes of the method may be carried out by the data stream processor 202 in which the processes are implemented by a plurality of lines of computer code. Alternatively, the processes may be implemented by a hardware circuit, such as a processor, FPGA, etc., that executes those processes as described above. In the method, a partial decode (302) of the incoming data stream is performed in which the incoming compressed data stream is decoded up to the point where the partially decoded incoming compressed data stream has a plurality of blocks of data. For example, in one implementation, the DCT coefficients of a DCT compressed data stream may be available for processing in Block form. In the system and method, the block may be a matrix/square in which each side of the square is an integer power of 2 (e.g., 2×2 block, 4×4 block, 8×8 block, 16×16 block, 32×32 block, etc.)

Once the incoming data stream is partially decoded, the method selects a most applicable transform information model for the each block in the partially decoded data stream (304) as described below in more detail. For example, in a transform in which the frequencies in a DCT block are being modified, if the incoming DCT block has a relatively flat visual characteristic (so called "low gradience"), a specific transform information model may be selected for it such as the example of the transform information model in FIG. 4A.

The system may have a number of transform information models stored and available or generated and available. The transform information models may include transforms that subtract a certain class of transform information models from the DCT coefficients in each block and transforms that apply a range of re-quantizations to the DCT coefficients in each block. Other possible transforms may be non-linear transformations that may test the values for certain thresholds (of the DCT coefficients in the block) and modify the values by adding or subtracting a constant from the value, Furthermore, combination of the above transforms may be used to output a modified set of values in the block. In an example of the operation, a block from the incoming data may have a slowly changing gradient in the background along with other features. In this example of the operation, the system decides, based on statistical properties of the block that no requantization is required, a particular transform information model needs to be subtracted from the values in the block and some of the values in the block need to be modified non-linearly by adding or subtracting a constant. The choice of transforms is typically made to minimize the size of the block while minimizing the impact on artifacts visible to the human eye.

Once the transform information model for each block is selected, the transform information model data is used to modify the block in the incoming partially decoded data stream (306.) For example, in an implementation in which DCT coefficient values are being modified, the transform information model data may be removed from the block. In one embodiment when the DCT block values are modified, if the absolute value in each DCT block in the incoming data stream is smaller than the absolute value in the transform information model, the DCT coefficient in the output data stream (that corresponds to the particular DCT block) is set to 0. In the one embodiment when the DCT block values are modified, if the absolute value in each DCT block in the incoming data stream is not smaller than the absolute value in the transform information model, the absolute value of the DCT coefficient in the incoming data stream is reduced to corresponding value in the transform information model, while maintaining the sign of the DCT coefficient in the original data stream.

Once the variable values have been modified, such as by the redundancy being removed in the DCT coefficients, the method restores the frequency (308.) Specifically, for coefficients whose redundancy removal above has introduced unacceptable visual difference in the block (using, for example, the method described below), the method restores those coefficients in the DCT block back to their original values from the DCT. With other transform information models, the restoration of the values may occur. For example, if the quantization parameters of the values in the block has changed, then the restoration is performed to account for this change.

Once the restoring of the frequency has been completed, the data stream may be re-encoded (310) using the modified data values based on the transform information model. In the implementation in which the DCT coefficients are modified, the data stream may be re-encoded with the DCT coefficients modified from the method (including possibly some original coefficients as well as some coefficients from the transform information model.)

Selecting the Most Applicable Transform Information Model

The appropriate transform information model, such as the RIM in the case of frequency reduction, for each block may be picked using one or more of the following criteria that may be assessed, for example, by the data stream processor 202 shown in FIG. 2. The criteria used to determine the appropriate RIM may include:

1. Size of the DCT block.
2. Statistical properties of the DCT block. (AC Energy, variance, etc.)
3. Statistical properties of the fully decoded pixels represented by the DCT block. (average value of pixels, variance of the pixels).
4. Other properties of the data stream (such as whether it is a Standard Definition (SD) or a High Definition (HD) image).

For example, if the incoming DCT block indicates a very high AC energy but is low on luminance, a collection of transforms (collectively called a transform model, which will include RIM subtraction, re-quantization as well as non-linear modification) will be selected that is more aggressive in what is subtracted from the block. In other cases, a transform model that makes minimal changes might be selected. Moreover, for an HD stream, a typical transform model will have different values for the higher frequency components because of different expected behavior in the human eye than a SD stream. When it is known that a SD stream is going to be displayed on a High Definition device, the transform model will anticipate the scaling-up of the image and be less aggressive on the mid-range and high frequencies.

In the system, one or more different transform information models may be constructed for various combinations of these criteria. For each different type of transformation (frequency reduction, noise reduction, re-quantization values, etc.), the criteria above may be computed when a block of the partially decoded incoming data stream is processed and the one or more criteria for the particular transformation use case for the particular block may be used to select the transform information model for the particular block. For example, for the frequency reduction using the DCT coefficients, the appropriate criteria are computed when a DCT block is processed (after partial decoding) and the combination of the criteria above in the particular block points to the RIM that needs to be selected for the particular block. One example of this process is, for example, when a DCT block with low variance and low gradience (see below, where 'low' means less than certain pre-determined thresholds) is processed, the RIM that was constructed for this type of an instance is used. The transform information models can vary depending upon whether the streams are Standard Definition or High Definition.

Frequency Restoration Criteria for Frequency Reduction Transformation

The human eye is very sensitive to certain types of compression artifacts (such as blockiness and contouring). For certain types of DCT blocks, the selected RIM may cause a worsening of those compression artifacts. For example, image blocks that have slowly changing gradients may be particularly susceptible to an immediate worsening of compression artifacts.

The identification of these types of DCT blocks may be accomplished by computing a variance of the first derivative of the pixels represented by the DCT block and may be known as 'Gradience.' The gradience may be calculated, for example, by computing the variance of the values derived by subtracting the value of pixel from its left neighbor and top neighbors respectively.

When the gradience is less than a certain threshold (which is treated as a parameter to the system and method), the DCT block is selected for Frequency Restoration. The gradience of the block may range from 0 to 255 and may be clipped to 255 if the gradience value is greater than 255. The gradience thresholds may also be determined empirically and may be application dependent and have a range of between 0 and 12. Depending upon the specific value of the Gradience, and the size of the DCT block, one or more frequencies in the DCT block are restored to their original incoming values. For example, applications requiring a high amount of visual fidelity will use very low values of gradience, and applications requiring lower visual fidelity will allow for higher values of gradience. In low gradience DCT blocks, for example, the frequencies in the lower range are restored if the visual impact of the RIM is unacceptable. Visual impact is assessed usually be determining if the frequency in that range has been set to 0, but any other reasonable metric can also be used.

Noise Reduction Transforms and Re-Quantization Transforms

Similar to the frequency reduction embodiment described above, the transform system may also be used to modify the values of a block of the partially decoded incoming data stream for noise reduction and re-quantizations values. The other transforms for noise reduction or re-quantization may similarly be a block of values which is a square matrix in which each side is an interger power of 2 in which the block of values are used to modify the values of each block in the incoming partially decoded incoming data stream. As described above for the frequency reduction, the transform information models for noise reduction or Re-quantization values may be selected based on some or all of the same criteria as the frequency reduction described above and then used to modify the values in the blocks of the data stream and the data stream may then be re-compressed.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for transforming data values in a compressed data stream, comprising:
   a data stream processor; and
   the data stream processor configured to partially decode a compressed incoming data stream into a plurality of blocks in which each block has a plurality of values, configured to select a transform model for each block, the selected transform model having a plurality of values wherein each value corresponds to a value in the block, configured to modify the values in each block using the values in the selected transform model corresponding to the values in each block and configured to encode a data stream with the plurality of blocks that contain the modified values.

2. The system of claim 1, wherein the transform model is one of a noise reduction information model, a frequency reduction information model and a re-quantization model as well as a non-linear coefficient modification model.

3. The system of claim 2, wherein the frequency reduction information model further comprises a plurality of coefficient values.

4. The system of claim 3, wherein the data stream processor is configured to restore the value to the partially decoded incoming data stream by changing a coefficient having a modified value back to its original value.

5. The system of claim 1, wherein the compressed incoming data stream is a DCT based compressed stream.

6. The system of claim 5, wherein the DCT based compressed stream is one of an MPEG-2 data stream, a H.264 data stream, a JPEG data stream, a motion JPEG data stream and a H.265 data stream.

7. The system of claim 1 further comprising a store that is configured to store a plurality of transform information models from which the transform information model is selected.

8. The system of claim 1, wherein the transform information model has a plurality of values wherein each value in the transform information model corresponds to a value in the block.

9. The system of claim 8, wherein the block is a square matrix and each side of the square matrix is an integer power of 2.

10. The system of claim 1, wherein the data stream processor is configured to select the transform information model for each block based in part of a gradience of the block in the partially decoded incoming data stream.

11. The system of claim 1, wherein the data stream processor is configured to select the transform information model for each block based on one or more of a size of the block, a statistical property of the block and a property of the block.

12. The system of claim 1, wherein the data stream processor is one of a processor and a programmable hardware device.

13. A method of transforming data values in a compressed data stream, comprising:
    partially decoding an incoming data stream into a plurality of blocks in which each block has a plurality of values;
    selecting a transform information model for each block, the selected transform information model having a plurality of values wherein each value corresponds to a value in the block;
    modifying the value of one or more values in each block based on the values in the selected transform model corresponding to the values in each block; and
    encoding a data stream with the plurality of blocks and the modified values.

14. The method of claim 13, wherein the transform model is one of a noise reduction information model, a frequency reduction information model and a re-quantization information model.

15. The method of claim 14, wherein the frequency reduction information model further comprises a plurality of coefficient values.

16. The method of claim 15 further comprising restoring the value to the partially decoded incoming data stream by changing a coefficient having a modified value back to its original value.

17. The method of claim 13, wherein the compressed incoming data stream is a DCT based compressed stream.

18. The method of claim 17, wherein the DCT based compressed stream is one of an MPEG-2 data stream, a H.264 data stream, a JPEG data stream, a motion JPEG data stream and a H.265 data stream.

19. The method of claim 13 further comprising storing a plurality of transform information models from which the transform information model is selected.

20. The method of claim 13, wherein the transform information model has a plurality of values wherein each value in the transform information model corresponds to a value in the block.

21. The method of claim 20, wherein the block is a square matrix and each side of the square matrix is an integer power of 2.

22. The method of claim 13, wherein selecting the transform information model for each block further comprises selecting the transform information model for each block based in part of a gradience of the block in the partially decoded incoming data stream.

23. The method of claim 13, wherein selecting the transform information model for each block further comprises selecting the transform information model for each block based on one or more of a size of the block, a statistical property of the block and a property of the block.

24. The method of claim 13 further comprising comparing, for each value in the block of the partially decoded incoming data stream, an absolute value of a value in the transform information model that corresponds to the value in the block to an absolute value of the value in the block and setting the value in the partially decoded incoming data stream to zero if the absolute value of the value in the block is smaller than the absolute value of a value in the transform information model that corresponds to the value in the block.

25. The method of claim 13 further comprising comparing, for each value in the block of the partially decoded incoming data stream, an absolute value of a value in the transform information model that corresponds to the value in the block to an absolute value of the value in the block and setting the value in the partially decoded incoming data stream to the value in the transform information model and maintaining a sign of the value in the partially decoded incoming data stream if the absolute value of the value in the block is not smaller than the absolute value of a value in the transform information model that corresponds to the value in the block.

26. A computer readable medium, comprising:
    instruction that partially decode an incoming data stream into a plurality of blocks in which each block has a plurality of values;
    instructions that select a transform information model for each block, the selected transform information model having a plurality of values wherein each value corresponds to a value in the block;
    instructions that modify the value of one or more values in each block based on the values in the selected transform model corresponding to the values in each block; and
    instructions that encode a data stream with the plurality of blocks and the modified values.

27. The medium of claim 26, wherein the transform model is one of a noise reduction information model, a frequency reduction information model and a re-quantization information model.

28. The medium of claim 27, wherein the frequency reduction information model further comprises a plurality of coefficient values.

29. The medium of claim 28 further comprising restoring the value to the partially decoded incoming data stream by changing a coefficient having a modified value back to its original value.

30. The medium of claim 26, wherein selecting the transform information model for each block further comprises selecting the transform information model for each block based in part of a gradience of the block in the partially decoded incoming data stream.

31. The medium of claim 26, wherein selecting the transform information model for each block further comprises selecting the transform information model for each block based on one or more of a size of the block, a statistical property of the block and a property of the block.

32. The medium of claim 26 further comprising comparing, for each value in the block of the partially decoded incoming data stream, an absolute value of a value in the transform information model that corresponds to the value in the block to an absolute value of the value in the block and setting the value in the partially decoded incoming data stream to zero if the absolute value of the value in the block is smaller than the absolute value of a value in the transform information model that corresponds to the value in the block.

33. The medium of claim 26 further comprising comparing, for each value in the block of the partially decoded incoming data stream, an absolute value of a value in the transform information model that corresponds to the value in the block to an absolute value of the value in the block and setting the value in the partially decoded incoming data stream to the value in the transform information model and maintaining a sign of the value in the partially decoded incoming data stream if the absolute value of the value in the block is not smaller than the absolute value of a value in the transform information model that corresponds to the value in the block.

\* \* \* \* \*